(12) United States Patent
Agrawal et al.

(10) Patent No.: US 11,722,767 B2
(45) Date of Patent: Aug. 8, 2023

(54) AUTOMATIC CAMERA SELECTION IN A COMMUNICATION DEVICE

(71) Applicant: MOTOROLA MOBILITY LLC, Wilmington, DE (US)

(72) Inventors: Amit Kumar Agrawal, Bangalore (IN); Rahul B. Desai, Hoffman Estates, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 17/571,892

(22) Filed: Jan. 10, 2022

(65) Prior Publication Data

US 2023/0224579 A1 Jul. 13, 2023

(51) Int. Cl.
*H04N 23/667* (2023.01)
*H04M 1/72454* (2021.01)
*G10L 25/78* (2013.01)
*H04M 1/7243* (2021.01)
*H04N 23/45* (2023.01)

(52) U.S. Cl.
CPC ........... *H04N 23/667* (2023.01); *G10L 25/78* (2013.01); *H04M 1/7243* (2021.01); *H04M 1/72454* (2021.01); *H04N 23/45* (2023.01); *G10L 2025/783* (2013.01)

(58) Field of Classification Search
CPC ............. H04N 5/23245; H04N 5/2258; H04N 23/667; H04N 23/04; G10L 25/78; G10L 2025/783; H04M 1/7243; H04M 1/72454
See application file for complete search history.

(56) References Cited

U.S. PATENT DOCUMENTS

| | | | |
|---|---|---|---|
| 9,467,648 B2* | 10/2016 | Kwon | H04N 5/272 |
| 2011/0249086 A1* | 10/2011 | Guo | H04N 5/272 |
| | | | 348/E7.083 |
| 2022/0398816 A1* | 12/2022 | Holmes | G06V 20/41 |

FOREIGN PATENT DOCUMENTS

| | | | |
|---|---|---|---|
| CN | 101291379 A | * | 10/2008 |
| WO | WO-2022195342 A1 | * | 9/2022 |

* cited by examiner

*Primary Examiner* — Timothy J Henn
(74) *Attorney, Agent, or Firm* — Isidore PLLC

(57) ABSTRACT

A method, a first communication device and a computer program product for selecting an active camera from a front facing camera and a rear facing camera for use during a video communication session. A request is detected, via a processor, to transition to a video communication session between the first communication device and a second communication device. The first communication device receives, from the second communication device, first context identifying data that identifies which of at least one front facing camera or at least one rear facing camera to activate. The first context identifying data is generated at the second communication device based on information within the exchanged communication. At least one front facing camera or at least one rear facing camera identified by the received first context identifying data is selected and activated.

20 Claims, 14 Drawing Sheets

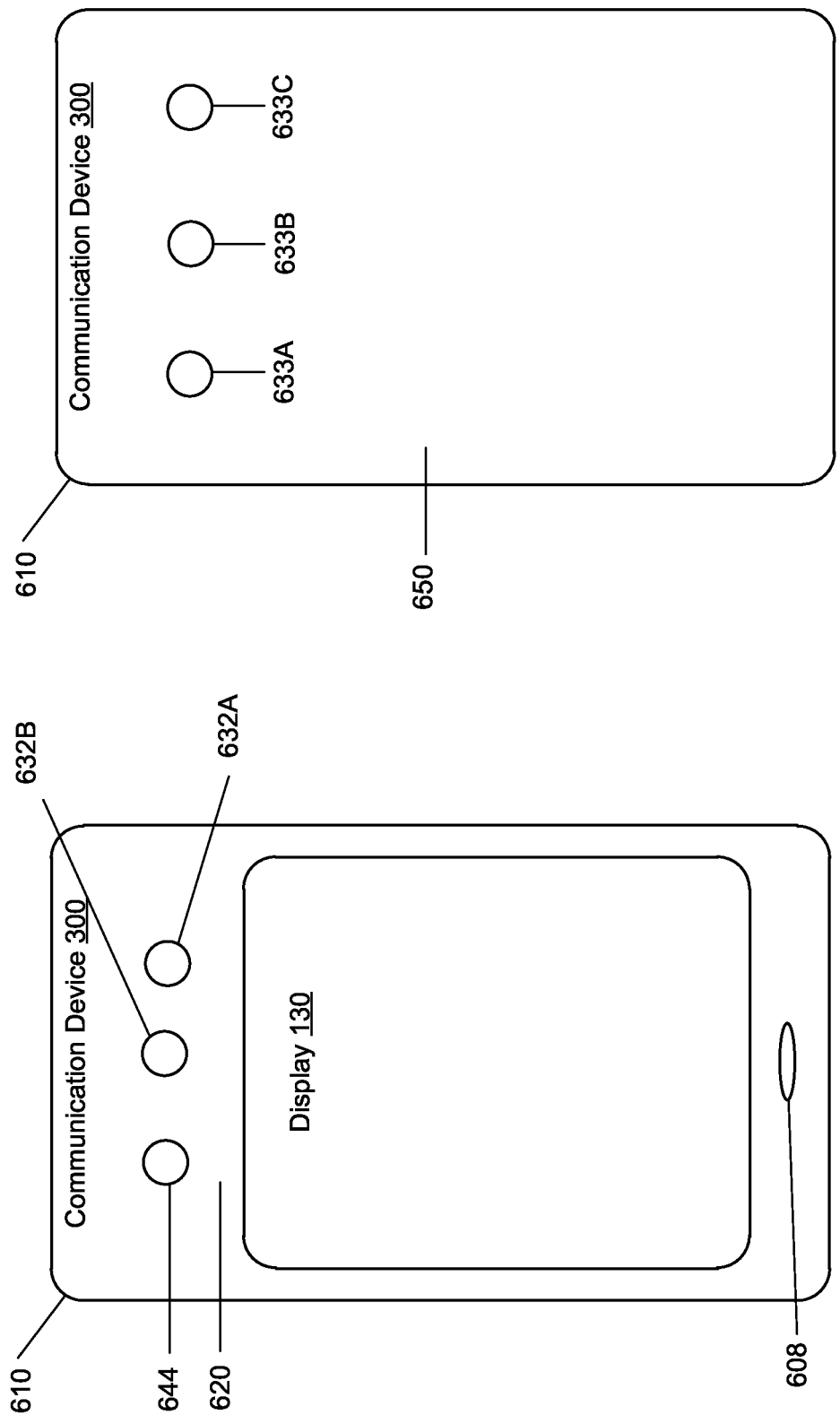

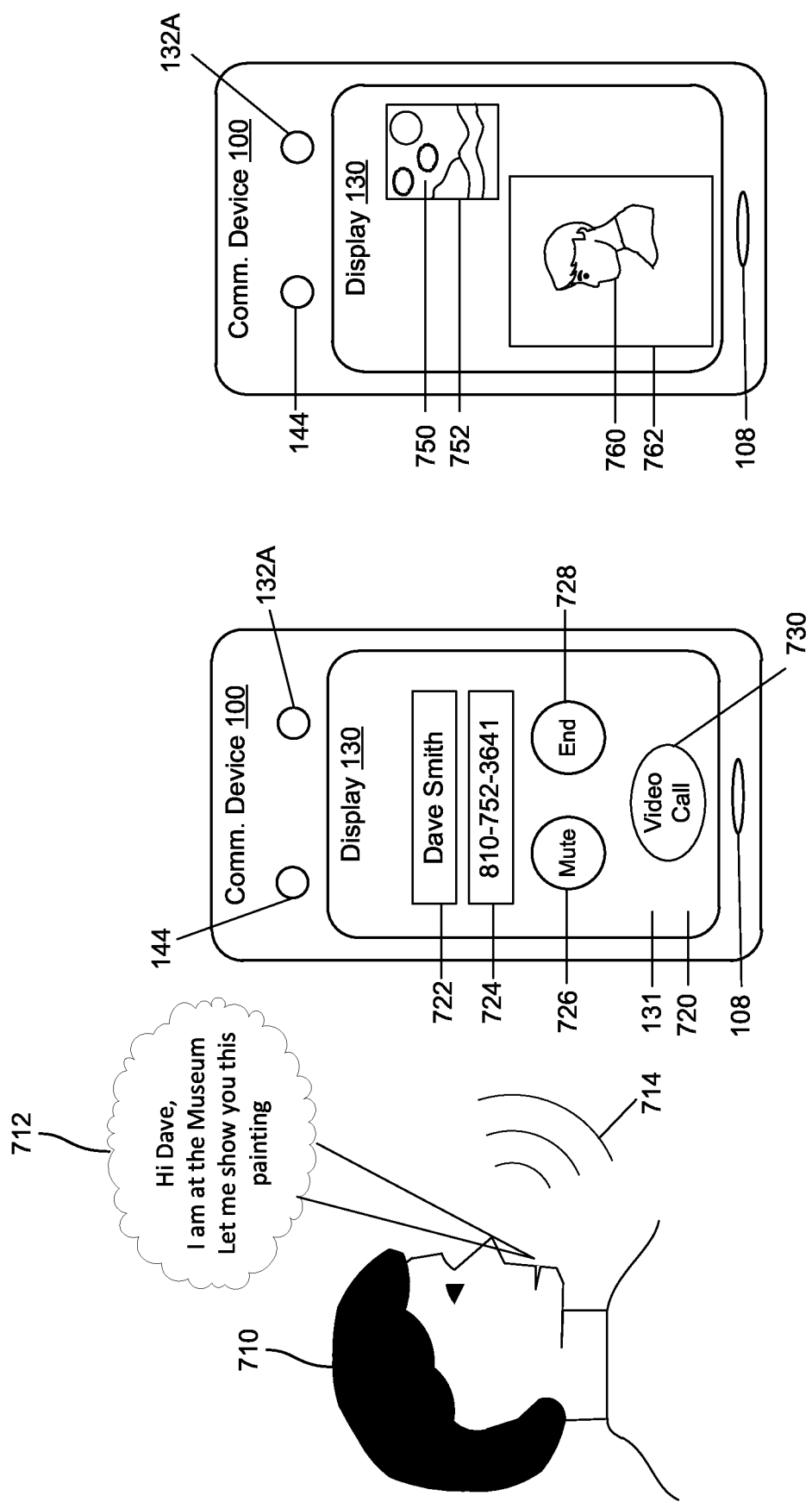

AUTOMATIC CAMERA SELECTION IN A COMMUNICATION DEVICE

BACKGROUND

1. Technical Field

The present disclosure generally relates to communication devices with cameras and in particular to automatic camera selection in communication devices.

2. Description of the Related Art

Communication devices, such as cell phones, tablets, and laptops, are widely used for communication and data transmission. These communication devices support various communication modes/applications, such as text messaging, audio calling and video calling. Communication devices typically include one or more cameras that are used for taking pictures and videos and supporting video calling. Many communication devices have a front facing camera and may have several rear facing cameras. The rear facing cameras can have lenses that are optimized for various focal angles and distances. For example, one rear facing camera can have a wide angle lens, another rear facing camera can have a telephoto lens, and an additional rear facing camera can have a macro lens. When a communication device user switches to a communication application, often the default camera is not the correct camera and the user has to manually select the correct camera to be used.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 6A is an example illustration of the front of a second communication device with front facing cameras, according to one or more embodiments;

FIG. 6B is an example illustration of the rear of a second communication device with multiple rear facing cameras, according to one or more embodiments;

FIG. 7A illustrates a communication device being used to complete an audio communication session by a user who is speaking, according to one or more embodiments;

FIG. 7B illustrates the communication device of FIG. 7A that has automatically selected a camera for the video communication session when switched from the audio communication session to a video communication session, according to one or more embodiments;

DETAILED DESCRIPTION

Figure 1A:
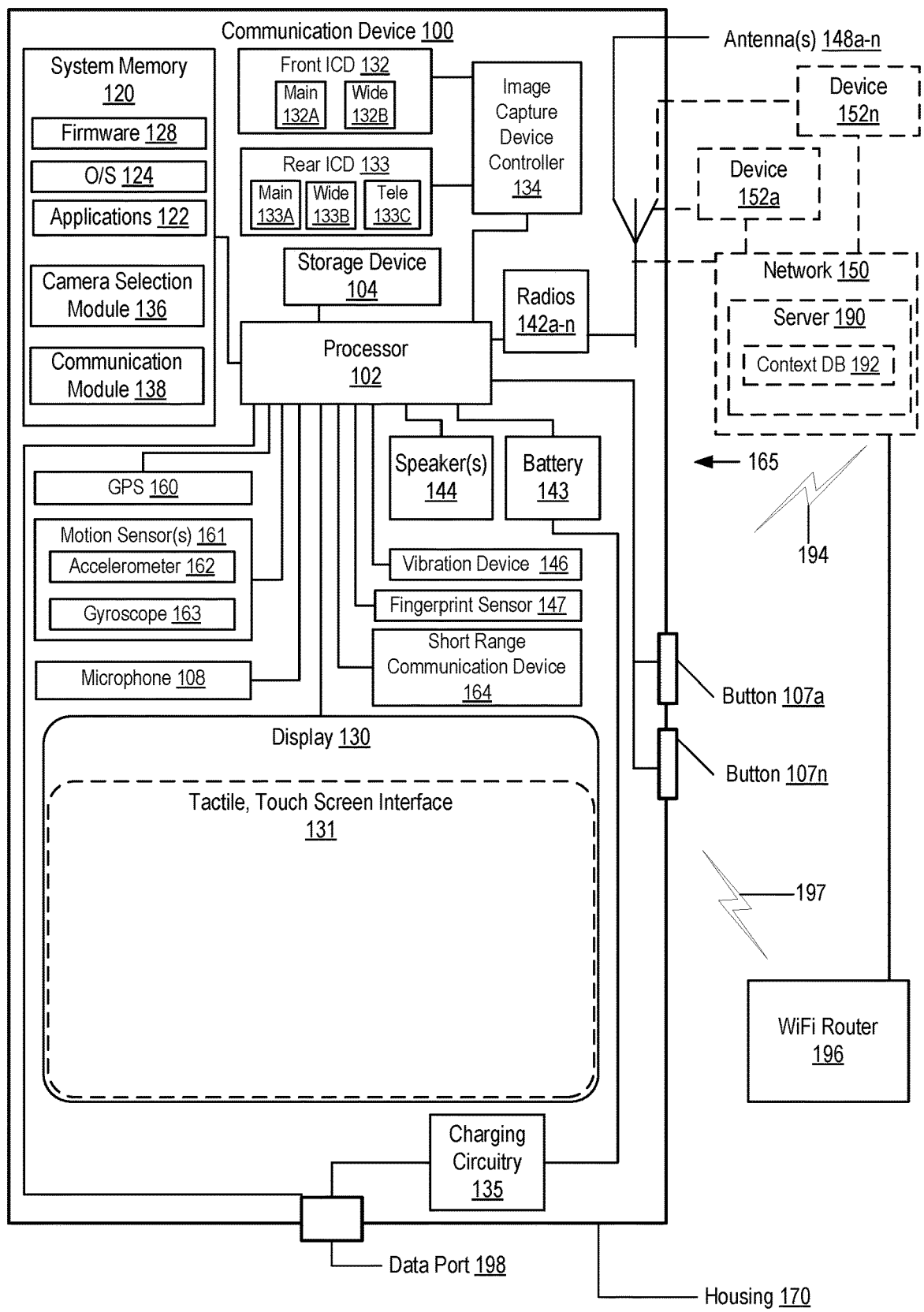
FIG. 1A depicts an example communication device within which various aspects of the disclosure can be implemented, according to one or more embodiments.

According to one aspect of the disclosure, the illustrative embodiments provide a method, a communication device, and a computer program product for contextually selecting an active camera from among at least one front facing camera and at least one rear facing camera for use by the communication device during a video communication session. In a first embodiment, the method includes receiving, via a processor, first communication input associated with a non-video communication session between a communication device and at least one second communication device. In response to detecting a switch from the non-video communication session to a video communication session, the method further includes determining a first context at the communication device based on the first communication input received during the non-video communication session. The first context correlates to (is associated with) using an active camera selected at the communication device to capture and share video data with the second communication device. The selected active camera is one of (i) a front facing camera from among at least one front facing camera and (ii) a rear facing camera from among at least one rear facing camera. The method further includes selecting, as the active camera, a corresponding one of the at least one front facing camera or the at least one rear facing camera that is best associated with the first context, the active camera capturing video content within a corresponding field of view (FOV) during the video communication session.

According to another embodiment, a communication device includes at least one front facing camera, at least one rear facing camera, at least one input device, a display, a communication interface that enables the communication device to communicatively connect to at least one second communication device via at least one network and a memory having stored thereon a context-triggered camera selection module for contextually selecting an active camera from among the at least one front facing camera and the at least one rear facing camera for use by the communication device during a video communication session. The communication device further includes at least one processor that is communicatively coupled to a respective controller of each of the at least one front facing camera and each of the at least one rear facing camera, and communicatively coupled to the at least one input device, the display, the communication interface, and the memory. The at least one processor executes program code of the context-triggered camera selection module, which enables the communication device to receive first communication input associated with a non-video communication session between the communication device and the at least one second communication device. In response to detecting a switch from the non-video communication session to a video communication session, the communication device determines a first context based on the first communication input received during the non-video communication session. The first context correlates to (is associated with) using an active camera selected at the communication device to capture and share video data with the second communication device. The selected active camera is one of (i) a front facing camera from among the at least one front facing camera and (ii) a rear facing camera from among the at least one rear facing camera. The communication device selects, as the active camera, a corresponding one of the at least one front facing camera or the at least one rear facing camera that is best associated with the first context. The active camera captures video content within a corresponding field of view (FOV) during the video communication session.

According to an additional embodiment, a computer program product includes a computer readable storage device having stored thereon program code which, when executed by at least one processor of a communication device having at least one front facing camera, at least one rear facing camera, at least one input device, a display, a communication interface that enables the communication device to communicatively connect to at least one second communication device via at least one network, and a memory, enables the communication device to complete the functionality of receiving first communication input associated with a non-video communication session between the communication device and the at least one second communication device. The computer program product further enables the communication device to in response to detecting a switch from the non-video communication session to a video communication session, determine a first context at the communication device based on the first communication input received during the non-video communication session. The first context correlates to (is associated with) using an active camera selected at the communication device to capture and share video data with the second communication device. The selected active camera is one of (i) the front facing camera from among at least one front facing camera and (ii) the rear facing camera from among at least one rear facing camera. The computer program product further enables the communication device to select, as the active camera, a corresponding one of the at least one front facing camera or the at least one rear facing camera that is best associated with the first context. The active camera capturing video content within a corresponding field of view (FOV) during the video communication session.

According to another aspect of the disclosure, the illustrative embodiments provide a method, a first communication device, and a computer program product for selecting an active camera from among at least one front facing camera and at least one rear facing camera for use by the first communication device during a video communication session. In a first embodiment, the method includes detecting, via a processor, a request to transition to a video communication session between the first communication device and at least one second communication device following exchange of communication via a non-video communication session. The method further includes receiving, at the first communication device from the at least one second communication device via a communication interface, first context identifying data that identifies which of at least one front facing camera or at least one rear facing camera to activate. The first context identifying data is generated at the at least one second communication device based on information within the exchanged communication. The method further comprises selecting and activating the at least one of the front facing camera or the at least one of the rear facing camera identified by the received first context identifying data.

According to another embodiment, a first communication device includes at least one front facing camera, at least one rear facing camera, a display, a communication interface that enables the first communication device to communicatively connect to at least one second communication device via at least one network and a memory having stored thereon a camera selection module for selecting at least one of the front facing camera or the rear facing camera for use by the first communication device. The communication device further includes at least one processor that is communicatively coupled to a controller of the at least one front facing camera and the at least one rear facing camera, and communicatively coupled to the display, the communication interface, and the memory. The at least one processor executes program code of the camera selection module, which enables the first communication device to detect a request to transition to a video communication session with the second communication device following exchange of communication via a non-video communication session. The first communication device receives, from the second communication device, first context identifying data that identifies which of the at least one front facing camera or the at least one rear facing camera to activate. The first context identifying data is generated at the second communication device based on information within the exchanged communication. The first communication device selects and activates the at least one of the front facing camera or the at least one of the rear facing camera identified by the received first context identifying data.

According to an additional embodiment, a computer program product includes a computer readable storage device having stored thereon program code which, when executed by at least one processor of a first communication device having at least one front facing camera, at least one rear facing camera, a display, a communication interface that enables the first communication device to communicatively connect to at least one second communication device via at least one network, and a memory, enables the first communication device to complete the functionality of detecting a request to transition to a video communication session with the second communication device following exchange of communication via a non-video communication session. The computer program product further enables the first communication device to receive, from the second communication device, first context identifying data that identifies which of the at least one front facing camera or the at least one rear facing camera to activate. The first context identifying data is generated at the second communication device based on information within the exchanged communication. The computer program product further enables the first communication device to select and activate the at least one of the front facing camera or the at least one of the rear facing camera identified by the received first context identifying data.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile communication device 100 (FIG. 1A) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A depicts an example communication device 100 within which various aspects of the disclosure can be implemented, according to one or more embodiments. Examples of such communication devices include, but are not limited to, a notebook computer, a mobile phone, a digital camera, a smart watch, and a tablet computer, etc. It is appreciated that communication device 100 can be other types of devices that include both at least one front facing camera and at least one rear facing camera and which supports both video and non-video communication with one or more second communication devices. Communication device 100 includes processor 102, which is communicatively coupled to storage device 104, system memory 120, input devices, introduced below, output devices, such as display 130, and image capture device (ICD) controller 134. Processor 102 can include processor resources such as a central processing unit (CPU) that support computing, classifying, processing and transmitting of data and information. In one or more embodiments, the functionality of ICD controller 134 is incorporated within processor 102, eliminating the need for a separate ICD controller.

System memory 120 may be a combination of volatile and non-volatile memory, such as random access memory (RAM) and read-only memory (ROM). System memory 120 can store program code or similar data associated with firmware 128, an operating system 124, applications 122, camera selection/context evaluation (CSCE) module 136, and communication module 138. CSCE module 136 includes program code that is executed by processor 102 to enable communication device 100 to contextually select an active camera from among at least one front facing camera and at least one rear facing camera for use during a video communication session. Communication module 138 includes program code that is executed by processor 102 to enable communication device 100 to communicate with other external devices and systems.

Although depicted as being separate from applications 122, CSCE module 136 and communication module 138 may also be each implemented as an application. Processor 102 loads and executes program code stored in system memory 120. Examples of program code that may be loaded and executed by processor 102 include program code associated with applications 122 and program code associated with CSCE module 136 and communication module 138.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control communication device 100 by touching features presented within/below the display screen. Tactile, touch screen interface 131 can also be referred to as an input device.

Throughout the disclosure, the term image capturing device is utilized interchangeably to be synonymous with and/or refer to any one of front or rear facing cameras 132, 133. Front facing cameras (or image capture device (ICD)) 132 are communicatively coupled to ICD controller 134, which is communicatively coupled to processor 102. ICD controller 134 supports the processing of signals from front facing cameras 132. Front facing cameras 132 can capture images that are within the field of view (FOV) of image capture device 132. Communication device 100 includes several front facing cameras 132. First front facing camera 132A is a main camera that captures a standard angle FOV. Second front facing camera 132B is wide angle camera that captures a wide angle FOV. While two front facing cameras 132 is shown, communication device 100 can have more or less than two front facing cameras.

Communication device 100 further includes several rear facing cameras 133. First rear facing camera 133A is a main camera that captures a standard angle FOV. Second rear facing camera 133B is wide angle camera that captures a wide angle FOV. Third rear facing camera 133C is a telephoto ICD that captures a telephoto FOV (zoom or magnified). Each rear facing camera 133A, 133B and 133C is communicatively coupled to ICD controller 134, which is communicatively coupled to processor 102. ICD controller 134 supports the processing of signals from rear facing cameras 133A, 133B and 133C. While three rear facing cameras are shown, communication device 100 can have less than three rear facing cameras, such as having only one rear facing camera or can have more than three rear facing cameras.

Communication device 100 can further include data port 198, charging circuitry 135, and battery 143. Communication device 100 further includes microphone 108, one or more output devices such as speakers 144, and one or more input buttons 107a-n. Input buttons 107a-n may provide controls for volume, power, and image capture device 132. Microphone 108 and input buttons 107a-n can also be referred to as input devices.

Communication device 100 further includes radios 142a-n, which are coupled to antennas 148a-n. In this implementation, radios 142a-n and antennas 148a-n allow communication device 100 to communicate wirelessly with other communication network devices 152a-n via one or more communication signals 194 to wireless network 150. In one embodiment, communication network devices 152a-n can be cellular sites or base stations that contain electronic communication equipment to allow communication with communication device 100. Wireless network 150 is communicatively coupled to wireless fidelity (WiFi) router 196. WiFi router 196 can also allow communication device 100 to communicate wirelessly with wireless network 150 via communication signals 197. In one embodiment, wireless network 150 can include a server 190 that stores a context database 192. Communication device 100 can receive context database 192 from wireless network 150.

Communication device 100 further includes vibration device 146, fingerprint sensor 147, global positioning system (GPS) device 160, and motion sensor 161. Vibration device 146 can cause communication device 100 to vibrate or shake when activated. Vibration device 146 can be activated during an incoming call or message in order to provide an alert or notification to a user of communication device 100. According to one embodiment, vibration device 146 can be programmed to vibrate the device 100 whenever the communication device 100 is no longer within a coverage area of a device-accessible wireless communication signal. According to one aspect of the disclosure, display 130, speakers 144, and vibration device 146 can collectively be referred to as output devices.

Fingerprint sensor 147 can be used to provide biometric data to identify or authenticate a user. GPS device 160 can provide time data and location data about the physical location of communication device 100 using geospatial input received from GPS satellites. In one embodiment, the time data and location data can be utilized by processor 102 in determining a current context of a communication.

Motion sensor(s) 161 can include one or more accelerometers 162 and gyroscope 163. Motion sensor(s) 161 can detect movement of communication device 100 and provide motion data to processor 102 indicating the spatial orientation and movement of communication device 100. Accelerometers 162 measure linear acceleration of movement of communication device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of communication device 100. Communication device 100 further includes a housing 170 that contains/protects the components of the communication device. In one or more embodiments, the measurements of these various sensors can also be utilized by processor 102 in the determining of the context of a communication.

Communication device 100 further includes short range communication device 164. Short range communication device 164 is a low powered transceiver that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, communication device 100 can receive internet or Wi-Fi based calls via short range communication device 164. In one embodiment, communication device 100 can communicate with WiFi router 196 wirelessly via short range communication device 164. In an embodiment, radios 142*a-n*, antennas 148*a-n* and short-range communication device 164 can be referred to as a communication interface 165 of communication device 100. Communication interface 165 enables communication device 100 to communicatively connect to at least one second communication device via at least one network.

In the description of each of the following figures, reference is also made to specific components illustrated within the preceding figure(s). Similar components are presented with the same reference number and some components may be provided with a subscripted reference number (e.g., 100a, 100b) to represent a same component/device being shown in a different context/configuration.

Figures 1B, 1C:
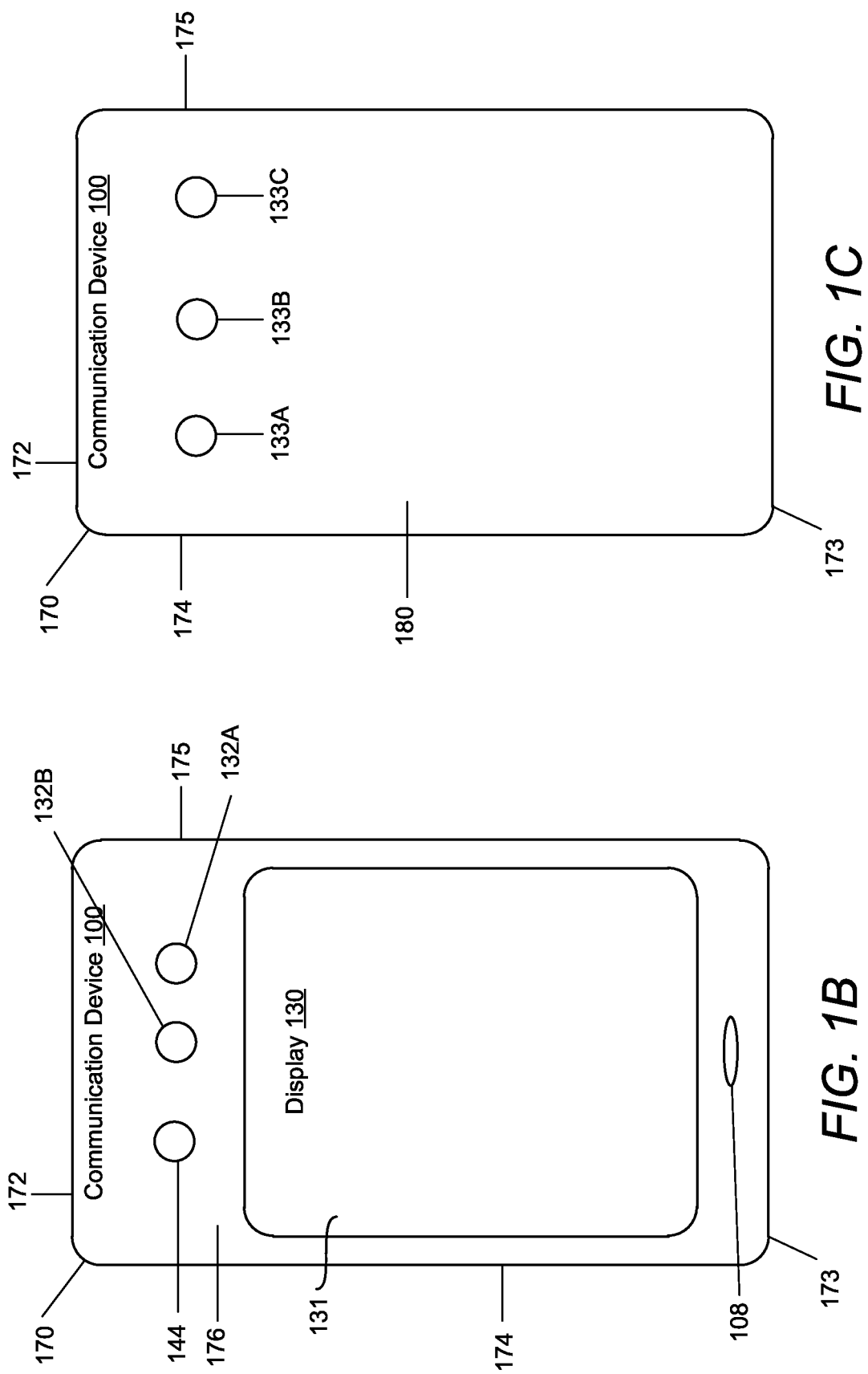
FIG. 1B is an example illustration of the front of a communication device with front facing cameras, according to one or more embodiments.
FIG. 1C is an example illustration of the rear of a communication device with multiple rear facing cameras, according to one or more embodiments.

Turning to FIG. 1B, additional details of the front of communication device 100 are shown. Communication device 100 includes a housing 170 that contains the components of communication device 100. Housing 170 includes a top 172, bottom 173, and opposed sides 174 and 175. Housing 170 further includes a front surface 176. Various components of communication device 100 are located on front surface 176. Microphone 108, display 130, front facing cameras 132A, 132B and speaker 144 are located on front surface 176. With additional reference to FIG. 1C, additional details of the rear of communication device 100 are shown. Housing 170 further includes a rear surface 180. Various components of communication device 100 are located on rear surface 180. The rear facing cameras 133 are located on rear surface 180. Rear facing main FOV camera 133A, rear facing wide angle FOV camera 133B and rear facing telephoto angle FOV camera 133C are located on rear surface 180. Each of the multiple rear facing cameras can have different image capturing characteristics. For example, rear facing telephoto angle FOV camera 133C can include an optical zoom lens that is optimized for capturing images of distant objects.

Figure 2:
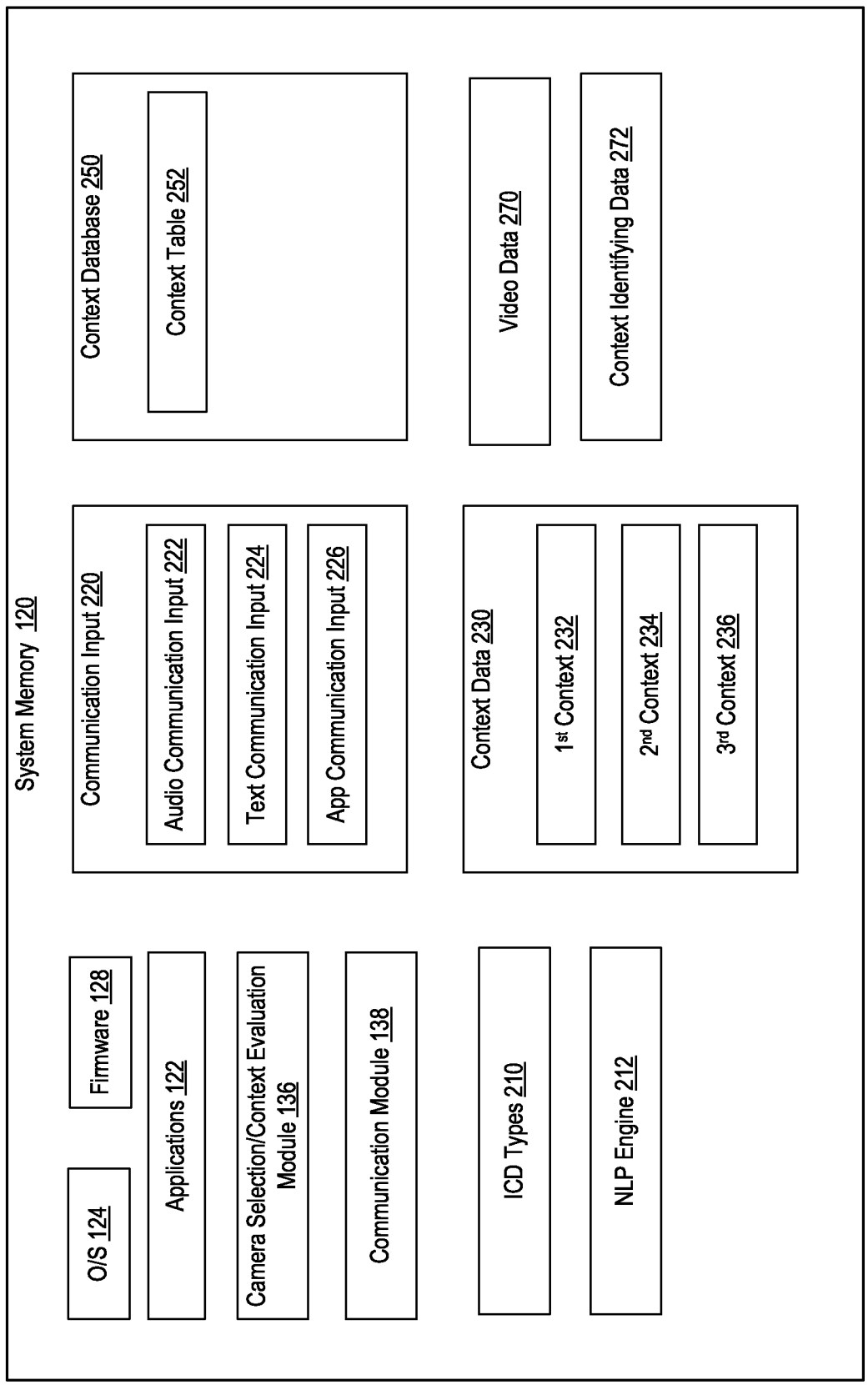
FIG. 2 is a block diagram of example contents of the system memory of the example communication device of FIG. 1A, according to one or more embodiments.

Referring to FIG. 2, there is shown one embodiment of example contents of system memory 120 of communication device 100. System memory 120 includes data, software, and/or firmware modules, including applications 122, operating system 124, firmware 128, CSCE module 136, and communication module 138.

CSCE module 136 includes program code that is executed by processor 102 to enable communication device 100 to identify a current context of a communication and contextually select an active camera from among at least one front facing camera 132 and at least one rear facing camera 133 for use when a switch from an audio or text communication session to a video communication session is detected. Communication module 138 enables communication device 100 to communicate with wireless network 150 and other devices via one or more of audio, text, and video communications. Communication module 138 supports various communication sessions by communication device 100 such as audio communication sessions, video communication sessions, text communication sessions, communication device application communication sessions, or a dual/combined audio/text/video communication session.

In one embodiment, CSCE module 136 enables communication device 100 to contextually select an active camera from among at least one front facing camera 132 and at least one rear facing camera 133 for use when a switch from an audio or text communication session to a video communication session is detected. In one embodiment, execution of CSCE module 136 by processor 102 enables/configures communication device 100 to perform the processes presented in the flowcharts of FIGS. 9 (9A-9B), 10 and 11 (11A-11B), as will be described below.

System memory 120 further includes camera types 210 and natural language processing (NLP) engine 212. Camera types 210 contains the specific front and rear facing cameras 132A, 132B, 133A, 133B and 133C that are included in communication device 100. NLP engine 212 enables communication device 100 to transcribe an audio stream from an audio communication session or communication application session into words in a text format. NLP engine 212 can also receive text input from a text communication session. NLP engine 212 further enables communication device 100 to determine what a body of text really means. Further details of NLP engine 212 will be described with reference to FIG. 4.

System memory 120 further includes communication input 220, context data 230, context database 250, and video data 270. Communication input 220 can be non-video communication input and includes audio communication input 222, text communication input 224, and application communication input 226. Audio communication input 222 is audio received via microphone 108. Text communication input 224 is text received via an input device such as tactile, touch screen interface 131, or keyboard (not shown). Application communication input 226 can be either audio or text input depending on the application 122 being used by communication device 100. Context data 230 is generated by NLP engine 212 based on communication input 220. Illustrated examples of context data 230 incudes first context 232, second context 234, and third context 236. Each of first context 232, second context 234, and third context 236 corresponds to a specific content received within communication input. For example, first context 232 can be generated by NLP engine 212 based on audio communication input 222. In one embodiment, NLP engine 212 can identify keywords and phrases in audio communication input 222. The audio communication input 222 can contains words and phrases having specific meaning and related to specific circumstances that are associated with the first context 232. The keywords and phrases are then used to identify one or more contexts. In one embodiment, the context data (i.e., first context 232) can include several context types that are subsets of the first context.

Context database 250 includes one or more context tables 252. Context table 252 contains a set of pre-determined context identifiers and context types that are associated with specific words and phrases received from NLP engine. These words and phrases refer to (or are correlate to) pre-identified contexts that are mapped within context tables. For example the word/phrase "my haircut" can be a keyword/key-phrase that is correlated within the context database to a context table referring to a self-image of the speaker. The context table can then be further aligned or linked to one or more of cameras 132, 133A, 133B and 133C. Context data 230 generated by NLP 212 based on communication input 220 is mapped/parsed to one or more entries within context table 252 to select the context identifiers and context types from the one or more entries within context table based 252 based on additional details provided by communication input 220 and additional contextual cues. Further details of context table 252 will be described with reference to FIG. 5. Video data 270 is video information that is exchanged between communication device 100 and a second communication device.

System memory 120 further includes context identifying data 272. Context identifying data 272 includes context identifiers and context types that result from the mapping/parsing of context table 252 with context data 230.

Figure 3:
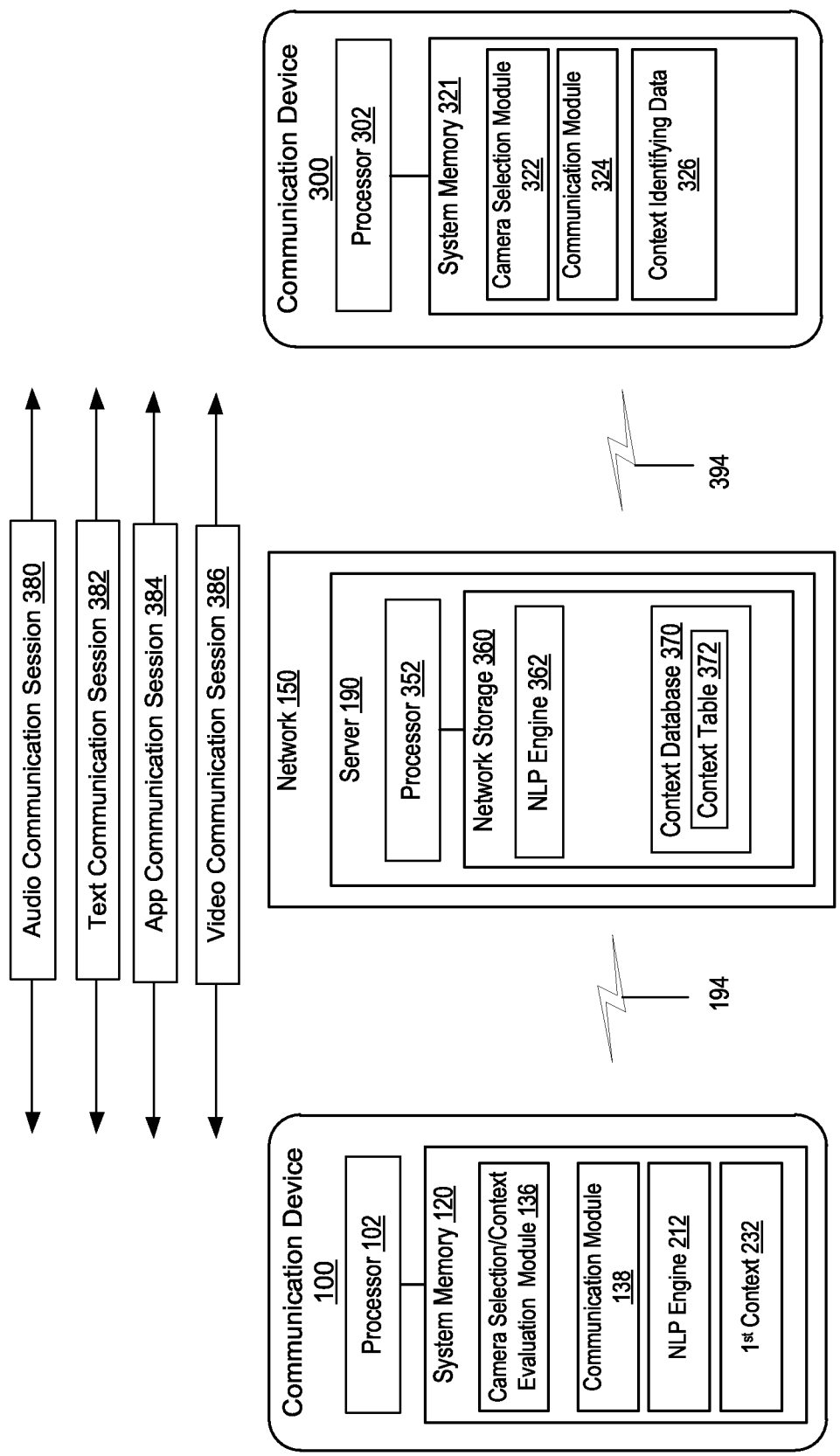
FIG. 3 is an example illustration of a two communication devices in communication via a wireless network, according to one or more embodiments.

FIG. 3 illustrates communication device 100 in communication with second communication device 300 via wireless network 150. Communication device 100 communicates wirelessly with wireless network 150 via one or more communication signals 194 and second communication device 300 communicates wirelessly with wireless network 150 via one or more communication signals 394.

Second communication device 300 includes one or more processors 302 and system memory 320. System memory 321 may be a combination of volatile and non-volatile memory, such as random access memory (RAM) and read-only memory (ROM). System memory 321 can store program code and data associated with camera selection (CS) module 322 and communication module 324. System memory 321 further incudes context identifying data 326. System memory 321 does not include an NLP engine.

CS module 322 includes program code that is executed by processor 302 to enable communication device 300 to select an active camera from among at least one front facing camera and at least one rear facing camera for use during a video communication session. Communication module 138 includes program code that is executed by processor 102 to enable communication device 300 to communicate with other external devices and systems, such as first communication device 100 (FIG. 1A).

Wireless network 150 further includes server 190. Server 190 includes one or more processors 352 and network storage 360. Network storage 360 can include storage devices such as system memory, hard drives and solid state drives. Network storage 360 includes NLP engine 362 and context database 370. Context database 370 includes one or more context tables 372. Context table 372 contains a set of pre-determined context identifiers and context types that are associated with specific words and phrases received from NLP engine.

Communication device 100 and communication device 300 can each communicate with each other, via wireless network 150, using one or more of several communication sessions. Communication device 100 and communication device 300 can communicate with each other using an audio communication session 380, a text communication session 382, an application communication session 384, and a video communication session 386, or a combination session.

In one embodiment, communication device 100 can receive communication input 220 associated with a non-video communication session (i.e., audio communication session 380 (FIG. 2)) between communication device 100 and communication device 300. When communication device 100 detects a switch from the non-video communication session 380 to a video communication session 386, processor 102, executing NLP engine 212 and CSCE module 136 can determine a first context 232 based on the audio communication input 380 and context database 250 (FIG. 2). The first context 232 can then be linked within context tables to using a specifically-selected active camera, selected at communication device 100 to capture and share video data with communication device 300 based on the context of the non-video communication. The selected active camera is one of front or rear camera 132A, 132B, 133A, 133B and 133C. The selected active camera corresponds to one of the front facing camera 132 or to one of the rear facing camera 133 that is the camera associated with the determined first context 232.

In another embodiment, communication device 100 can transmit communication input 220 to server 190 for remote processor 352, executing NLP engine 362, to process the received communication input 220. Server 190 can transmit the processed communication input to communication device 100. Communication device 100 can then continue selecting the active camera based on the determined context, as previously described. According to one aspect, by executing NLP engine 362 within server 190, local processing resources are freed up for communication device 100.

In an additional embodiment, context database 370 can be stored at server 190 instead of within communication device 100. Communication device 100 can transmit a request to server 190 when the context database is needed. Server 190 can respond to the request by transmitting context database 370 to communication device 100.

In one more embodiment, communication device 300 does not include NLP engine or other components that enable communication device 300 to locally determine context of a non-video communication. Communication device 300 can request and receive from communication device 100 context identifying data 326 that identifies which of at least one front facing camera 132 camera or at least one rear facing camera 133 to activate. The context identifying data 272 received from communication device 100 is stored as context identifying data 326 at communication device 300. The first context identifying data is generated at communication device 100, based on information within the exchanged communication occurring prior to a start of the video communication. Communication device 100 can generate corresponding context identifying data 272 based on the received non-video communication input.

Figure 4:
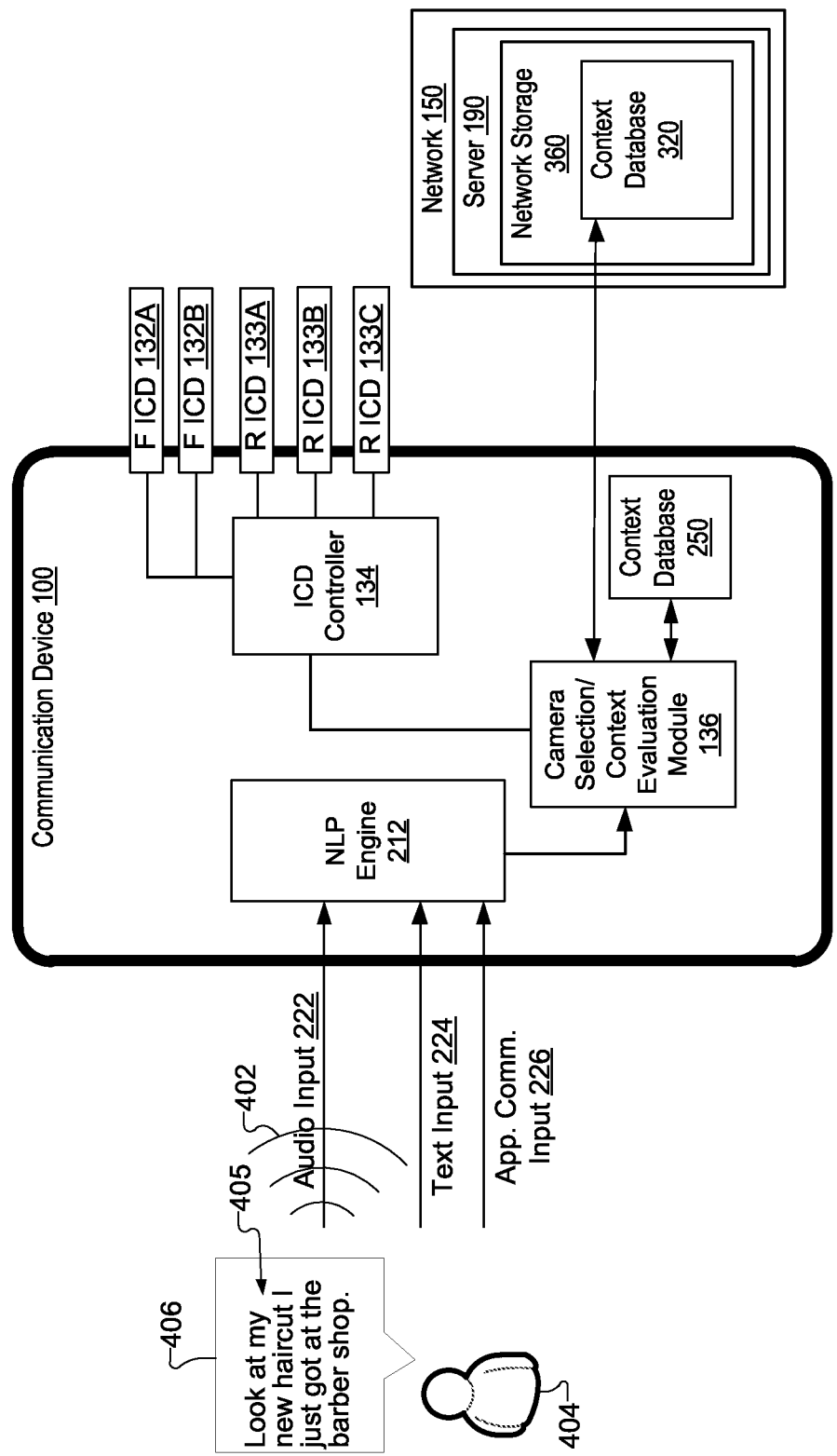
FIG. 4 illustrates an example system in which an communication device generates a context of a non-video communication session using a natural language processing engine (NLP) and a context evaluation module, in accordance with one or more embodiments of this disclosure.

With reference to FIG. 4, an example system in which communication device 100 implements NLP engine 212 and CSCE module 136 to generate a context of a non-video communication session is shown. Communication device 100 passively listens to an audio stream 402 containing speech 406 spoken by user 404. Speech 406 of user 404 follows a natural language format, in that user 404 speaks without conscious planning or premeditation, as if speaking to another person. Speech 406 of user 404 is a natural language input that does not contain or require a wake-up word for NLP engine 212 to process speech 406. Communication device 100 and NLP engine 212 can receive various types of non-video communication input. Communication device 100 and NLP engine 212 can receive audio communication input 222 (i.e., speech 406), text communication input 224, and application communication input 226.

Within communication device 100, NLP engine 212 transcribes audio stream 402 (including sounds uttered by user 404) into words in a text format (generated text). Communication device 100 generates a transcription of audio stream 402 (for example, a text format representation of speech 406). More particularly, communication device 100 generates the transcription by implementing NLP on speech 406 (received speech) within audio stream 402. NLP engine 212 further enables communication device 100 to determine what a body of text really means by comparing the text to known database of information, such as context database 250. Within communication device 100, NLP engine 212 receives a transcription of audio stream 402, for example, a text format representation of speech 405. NLP engine 212 determines/generates one or more contexts (i.e., first context 232) from the text transcription. For example, NLP engine 212 can determine that the text context includes keywords such as "my" and "I" that are used to identify that the speech context is related to a self-image about the speaker.

In one example of the NLP processes, communication device 100 detects multiple keywords (for example, "mountains" and "hiking") related to an outdoor domain, and communication device 100 determines that audio stream 402 contains speech 406 that is related to an outdoor context. In another example, communication device 100 can detect a pairing of a keyword (for example, "mountains" and a context word (for example, "skiing") and determine (with high confidence) that audio stream 402 contains speech 406 that is related to an outdoor context.

Communication device 100 further implements CSCE module 136 based on the context (first context 232). Communication device 100 retrieves context database 250 containing context table 252 from system memory 120. Context table 252 is used to map/parse the context data (i.e. first context 232) to one or more entries within context table 252. CSCE module 136 enables communication device 100 to map/parse first context 232 to one or more entries within context table 252 and to identify, based on the mapping/parsing, a corresponding correlation to one of front facing camera 132 or at least one of rear facing cameras 133 that is associated with the first context. For example, if the first context is related to a self-image about the speaker, the selected camera can be front facing camera 132A. Communication device 100 can trigger ICD controller 134 to activate the selected camera (i.e., front facing camera 132A) for use during a video communication session. ICD controller 134 receives the trigger for activating the selected camera when the video communication session is initiated. Communication device 100 can generate corresponding context identifying data 272 based on the received communication input.

If a rear facing camera is selected, CSCE module 136 can further enable communication device 100 to select a specific one of the rear facing cameras 133 based on additional details (sub-contextual information) provided with the first context. Communication device 100 can identify, based on the mapping/parsing, a specific one of the rear facing cameras 133A, 133B or 133C that is associated with the first context. In one embodiment, the context data (i.e., first context 232) can include several context types that are subsets of the first context and are associated respectively with one or more of the rear facing cameras. For example, if the first context is related to "outdoors" and "mountains", the selected camera can be wide angle camera 133B. Communication device 100 can trigger ICD controller 134 to activate the selected camera (i.e., wide angle camera 133B) for use during the video communication session. ICD controller 134 receives the trigger for activating the selected camera when the video communication session is initiated.

In an alternative embodiment, the context database can be stored in server 190. Communication device 100 can retrieve context database 320 from server 190. Communication device 100 can request context database 320 (or specific portions thereof) from server 190 and server 190 can respond by transmitting portions of context database 320 to communication device 100.

Figure 5:
FIG. 5 is an example illustration of a context table used in determining which one of the multiple cameras to use in a video communication session, according to one or more embodiments.

FIG. 5 illustrates an example context table 252 used in selecting one of the multiple cameras (i.e., front or rear cameras 132A, 133A, 133B and 133C) to be used in a video communication session. Context table 252 includes columns of context identifiers 510, context types 520, and indication of front ICD 132A and rear ICD(s) 133. Communication device 100 uses context table 252 to identify, based on the mapping/parsing of the context data 230 to context table 252, a context and/or sub-context of the non-video communication and a corresponding one of front facing camera 132A or at least one of rear facing camera 133 that is associated with the identified context. For example, if the context identifier 510, is "self-image" and the context type 520 is "speaker", the selected camera can be front facing camera 132A as indicated by an "X" in the box under the front facing camera 132A column in context table 252. In another example, if the context identifier 510 is "outdoors" and the context type 520 is "mountains", the selected camera can be wide angle rear facing camera 133B as indicated by an "X" in the box under the wide angle camera 133B column in context table 252.

Turning to FIG. 6A, details of the front of communication device 300 are shown. Communication device 300 includes a housing 610 that contains the components of communication device 300. Housing 610 includes a front surface 620. Various components of communication device 300 are located on front surface 620. Microphone 608, display 630, front facing cameras 632A, 632B and speaker 644 are located on front surface 620. With additional reference to FIG. 6B, additional details of the rear of communication device 300 are shown. Housing 610 further includes a rear surface 650. Various components of communication device 300 are located on rear surface 650. The rear facing cameras 633 are located on rear surface 650. Rear facing main FOV camera 633A, rear facing wide angle FOV camera 633B and rear facing telephoto angle FOV camera 633C are located on rear surface 650. Rear facing cameras 633A, 633B and 633C are collectively referred to as rear facing cameras 633.

Referring to FIG. 7A, communication device 100 is shown being used to complete an audio communication session by a user 710 who is speaking. In FIG. 7A, communication device 100 is in an audio communication session 380 (i.e., a non-video communication session) with communication device 300 (FIG. 3) via communication interface 165 and wireless network 150. In one embodiment, audio communication session 380 can be a phone call. Communication device 100, using microphone 108, listens to an audio stream 714 containing speech 712 spoken by user 404. Communication device 100 is shown with an example graphical user interface (GUI) 720 presented on display 130 during audio communication session 380. GUI 720 includes username 722 associated with communication device 300, phone number 724 of communication device 300, "Mute" icon 726, "End" icon 728 and "Video Call" icon 730. When selected by a user, e.g., via touch screen interface 131, "Video Call" icon 730 triggers communication device 100 to switch from audio communication session 380 and initiate video communication session 386 with communication device 300.

During the audio communication session 380 and prior to initiating the video communication session 386, NLP engine 212 enables communication device 100 to transcribe speech 712 into words in a text format. In response to detecting a switch from the audio communication session 380 to a video communication session 386, NLP engine 212 enables communication device 100 to determine one or more contexts (i.e., first context 232) from the text transcription. For example, communication device 100 can determine that the text includes keywords such as "Museum" and "painting" that are used to identify that the first context 232 is "place" and "medium object".

Camera selection/context evaluation module 136 enables communication device 100 to map/parse the first context 232 (museum and medium object) to one or more entries within context table 252 and to identify, based on the mapping/parsing, a corresponding one of cameras 132 or 133 that is associated with the first context 232. For example, if the first context 232 is "place" and a "near object", communication device 100 can identify the rear facing camera and select main FOV camera 133A. Communication device 100 can trigger ICD controller 134 to activate the selected rear facing camera (i.e., wide angle camera 133B) for use during video communication session 386.

With reference now to FIG. 7B, after the "Video Call" icon 730 has been selected by a user and video communication session 386 has been initiated, the selected active camera (i.e., select main FOV camera 133A) displays the captured video image 750 of a painting in sent video window 752 on display 130. A received video image 760 from communication device 300 is shown in received video window 762 on display 130. The captured video image 750 is transmitted to communication device 300 as part of video communication session 386.

According to one aspect of the disclosure, communication device 100 can automatically determine and select which camera to use when switching from an audio communication session to a video communication session. By automatically selecting which camera to use, communication device 100 frees the user from the task of having to manually select which camera is optimal to use during a video communication session 386.

Figure 8B:
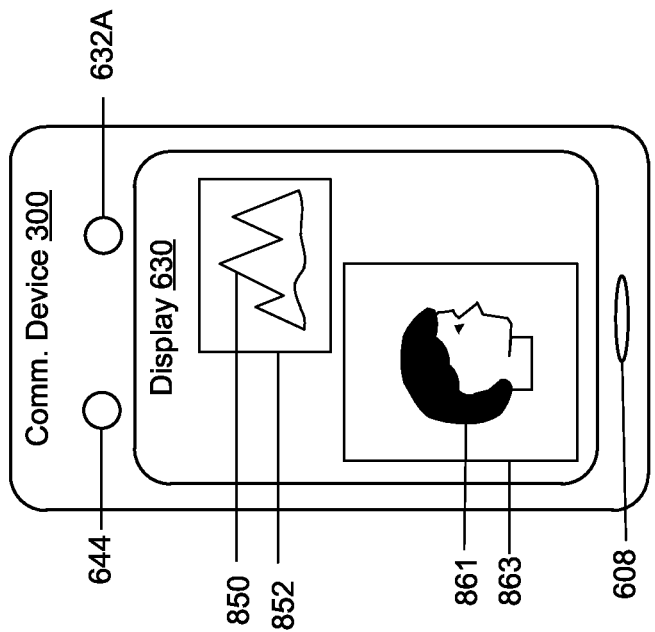
FIG. 8B illustrates the second communication device of FIG. 8A that has received context identifying data from a first communication device to trigger automatic camera selection when switching from the audio communication session to a video communication session, according to one or more embodiments.
Figure 8A:
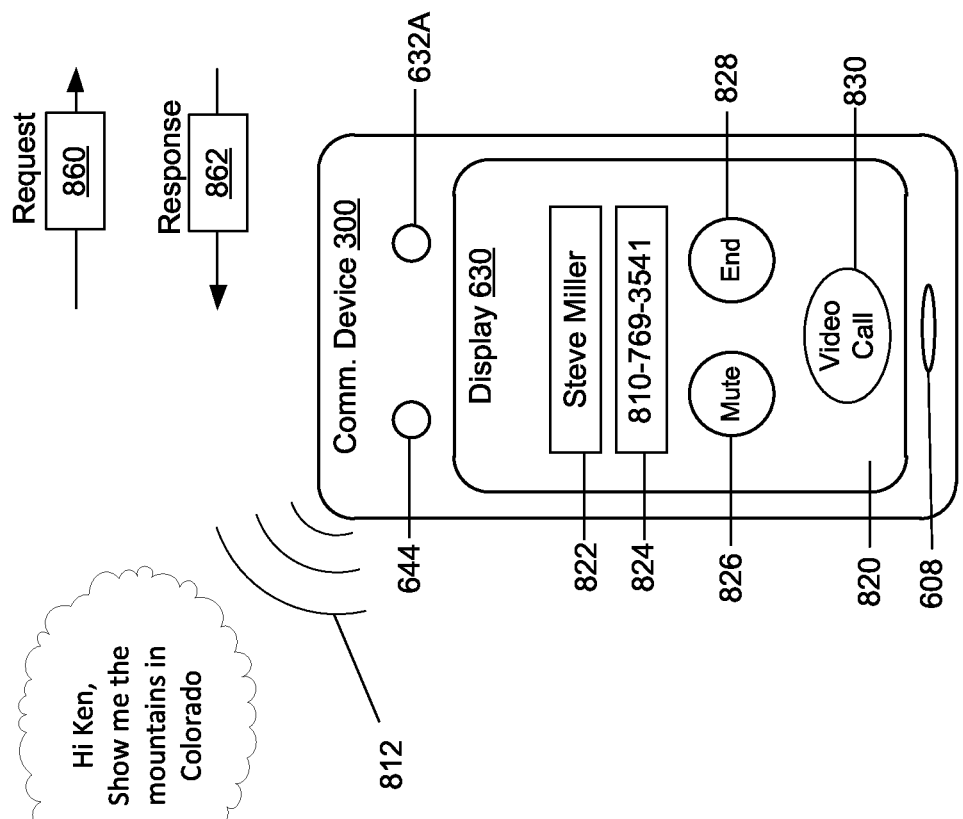
FIG. 8A illustrates a second communication device in an audio communication session with a first communication device, according to one or more embodiments.

FIG. 8A illustrates communication device 300 in an audio communication session 380 (i.e., a non-video communication session) with communication device 100 (FIG. 1A) via communication interface 165 and wireless network 150. In one embodiment, audio communication session 380 can be a phone call. Communication device 300 can play audio stream 812 via speaker 644. Communication device 300 is shown with an example graphical user interface (GUI) 820 presented on display 630 during audio communication session 380. Communication device 300 includes microphone 608, front facing camera 632A and speaker 644. In FIG. 8A, only one of the front facing cameras (i.e., front facing camera 132A) is shown. Communication device 300 further includes rear facing cameras 633A, 633B and 633C. Front facing camera 632A and rear facing cameras 633A, 633B and 633C correspond respectively to the previously described front and rear facing cameras 132A, 133A, 133B and 133C of communication device 100.

GUI 820 includes the username 822 of communication device 100, the phone number 824 of communication device 100, "Mute" icon 826, "End" icon 828 and "Video Call" icon 830. When selected by a user, e.g., via touch screen interface 131, "Video Call" icon 830 triggers communication device 300 to switch from the audio communication session 380 and initiate video communication session 386 with communication device 100.

In response to detecting a switch from the audio communication session 380 to a video communication session 386, Communication device 300 transmits a request 860 to communication device 100 for context identifying data 272. Communication device 100 transmits a response 862 of context identifying data 272 to communication device 300 in response to request 860. The context identifying data 272 received from communication device 100 is stored as context identifying data 326 at communication device 300. The context identifying data 326 is used to identify which camera to activate during video communication session 386. The context identifying data 326 is generated, at communication device 100, based on information within the exchanged audio communication session 380.

In one embodiment, CS module 136 enables communication device 300 to select a corresponding one of front or rear cameras 632 and 633 that is associated with the context identifying data. For example, if the context identifying data 326 is "place" and "large object", communication device 300 can identify and select wide angle FOV camera 633B. Communication device 300 can trigger ICD controller 134 to activate the selected rear camera (i.e., wide angle FOV camera 633B) for use during video communication session 386.

With reference now to FIG. 8B, after the "Video Call" icon 830 has been selected by a user and video communication session 386 has been initiated, the selected active rear camera (i.e., wide angle FOV camera 633B) displays the captured video image 850 of a mountain in sent image video window 852 on display 630. A received video image 861 of a user of communication device 100 is shown in received image window 863 on display 630. The captured video image 850 is transmitted to communication device 100 as part of video communication session 386.

According to one aspect of the disclosure, by receiving context identifying data 272 from communication device 100, communication device 300 can still implement context-based automatic camera selection without having an NLP engine integrated into communication device 300. By omitting NLP engine from communication device 300, processing resources can be increased and communication devices with lower processing capability can still select a correct camera to activate from among several cameras for use during a video communication session.

In one embodiment, processor 102, executing context-triggered CSCE module 136, receives first communication input 220 associated with a non-video communication session (i.e., audio communication session 380, text communication session 382, application communication session 384) between a communication device (i.e., communication device 100) and at least one second communication device (i.e., communication device 300). In response to detecting a switch from the non-video communication session to a video communication session 386, processor 102, determines a first context 232 based on the first communication input 220 received during the non-video communication session. The first context 232 is associated with using an active camera selected to capture and share video data 270 with communication device 300. The selected active camera is one of a front facing camera from among at least one front facing camera (132A, 132B) and a rear facing camera from among at least one rear facing camera (133A, 133B, and 133C). The method further includes selecting, as the active camera, a corresponding one of the at least one front facing camera (132A, 132B) or the at least one rear facing camera (133A 133B and 133C) that is associated with the first context 232, the active camera capturing video content within a corresponding field of view (FOV) during the video communication session 386.

In another embodiment, processor 302, executing camera selection module 322, detects a request to transition to a video communication session 386 between a first communication device (i.e., communication device 300) and at least one second communication device (i.e., communication device 100) following exchange of communication via a non-video communication session (i.e., audio communication session 380, text communication session 382, application communication session 384). Processor 302 receives, at the first communication device (i.e., communication device 300) from the at least one second communication device (i.e., communication device 100) via a communication interface 165, context identifying data 326 that identifies which of at least one front facing camera (632A, 632B) or at least one rear facing camera (633A, 633B and 633C) to activate. The context identifying data 326 is generated at the at least one second communication device (i.e., communication device 100) based on information within the exchanged communication. Processor 102 selects and activates at least one of the front-facing camera (632A, 632B) or at least one of the rear facing-camera (633A, 633B and 633C) identified by the received context identifying data 326.

Figure 9A:
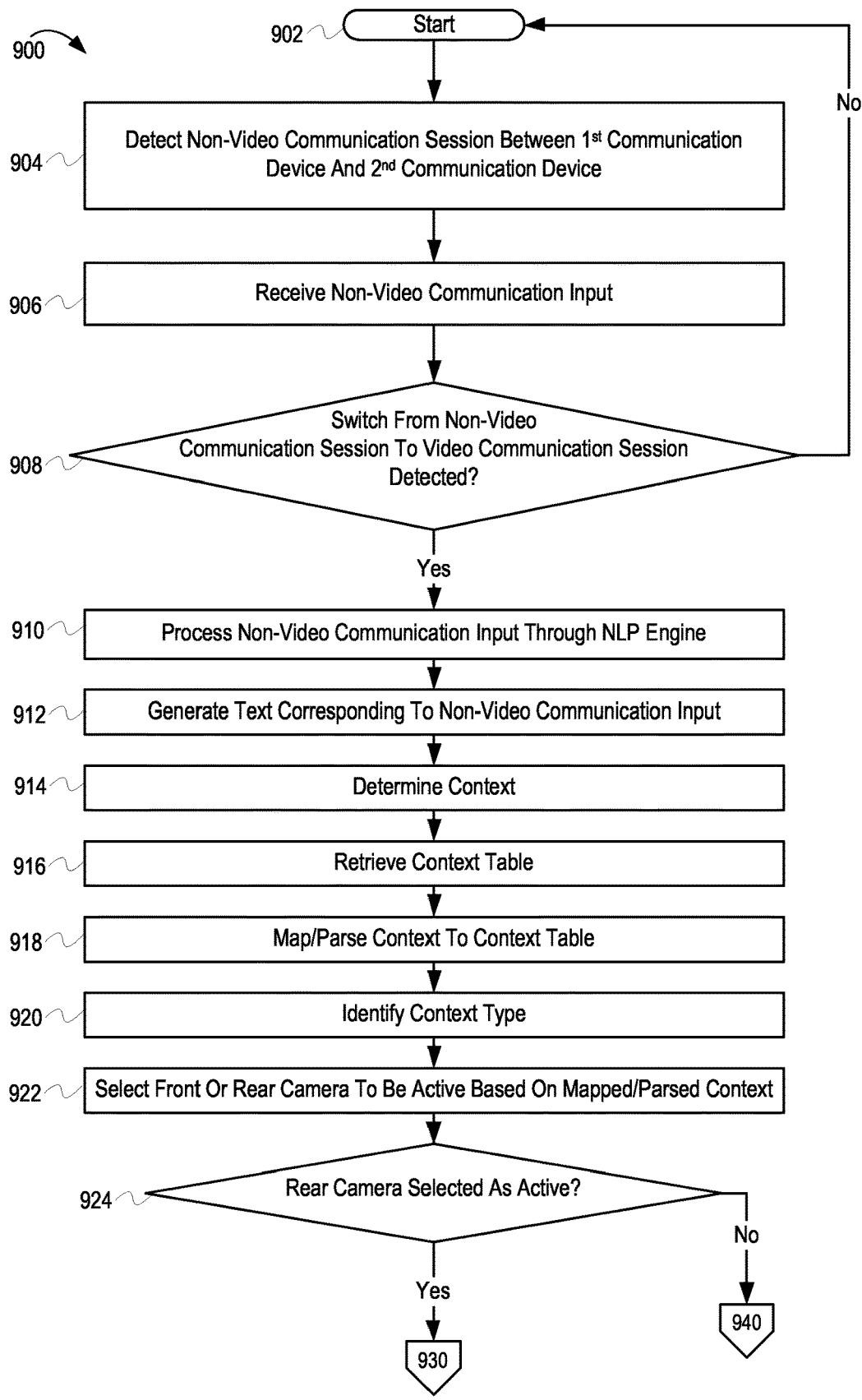
FIGS. 9A and 9B depict a flowchart of a method by which a communication device selects an active camera from among at least one front facing camera and at least one rear facing camera for use by the communication device during a video communication session, according to one or more embodiments.
Figure 9B:
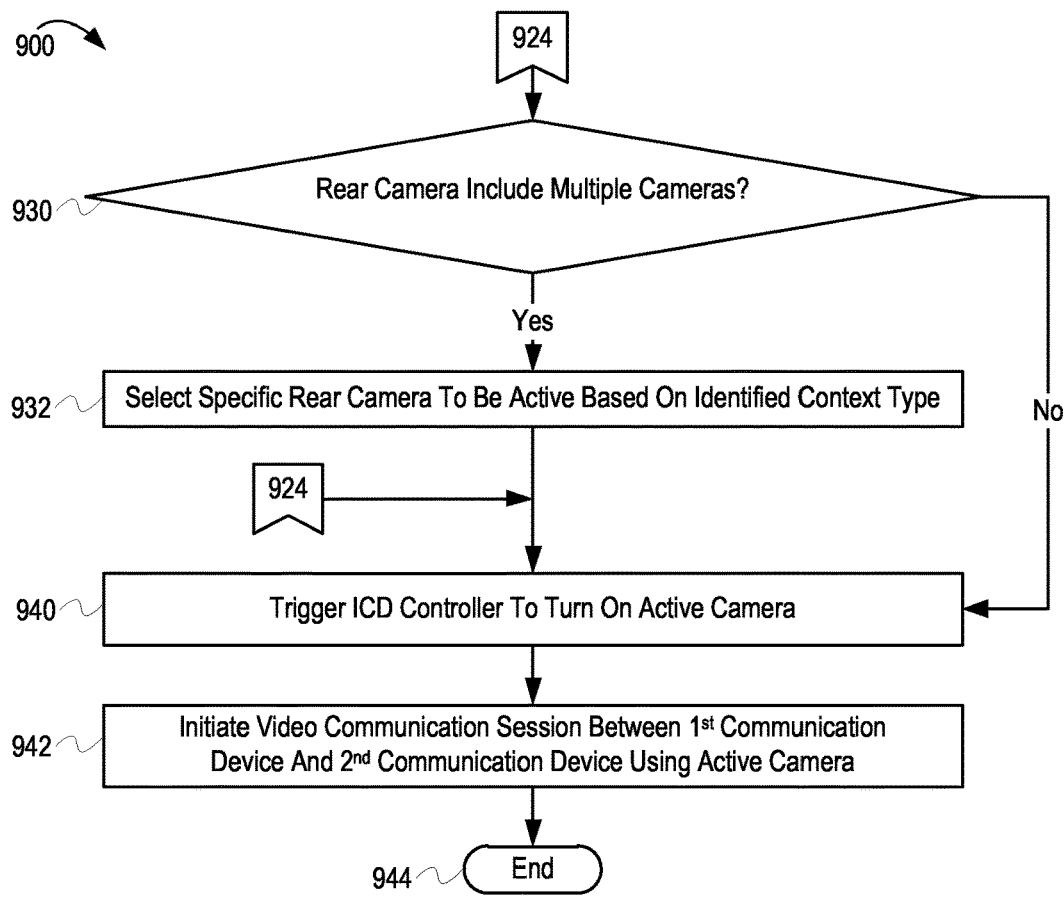
Figure 10:
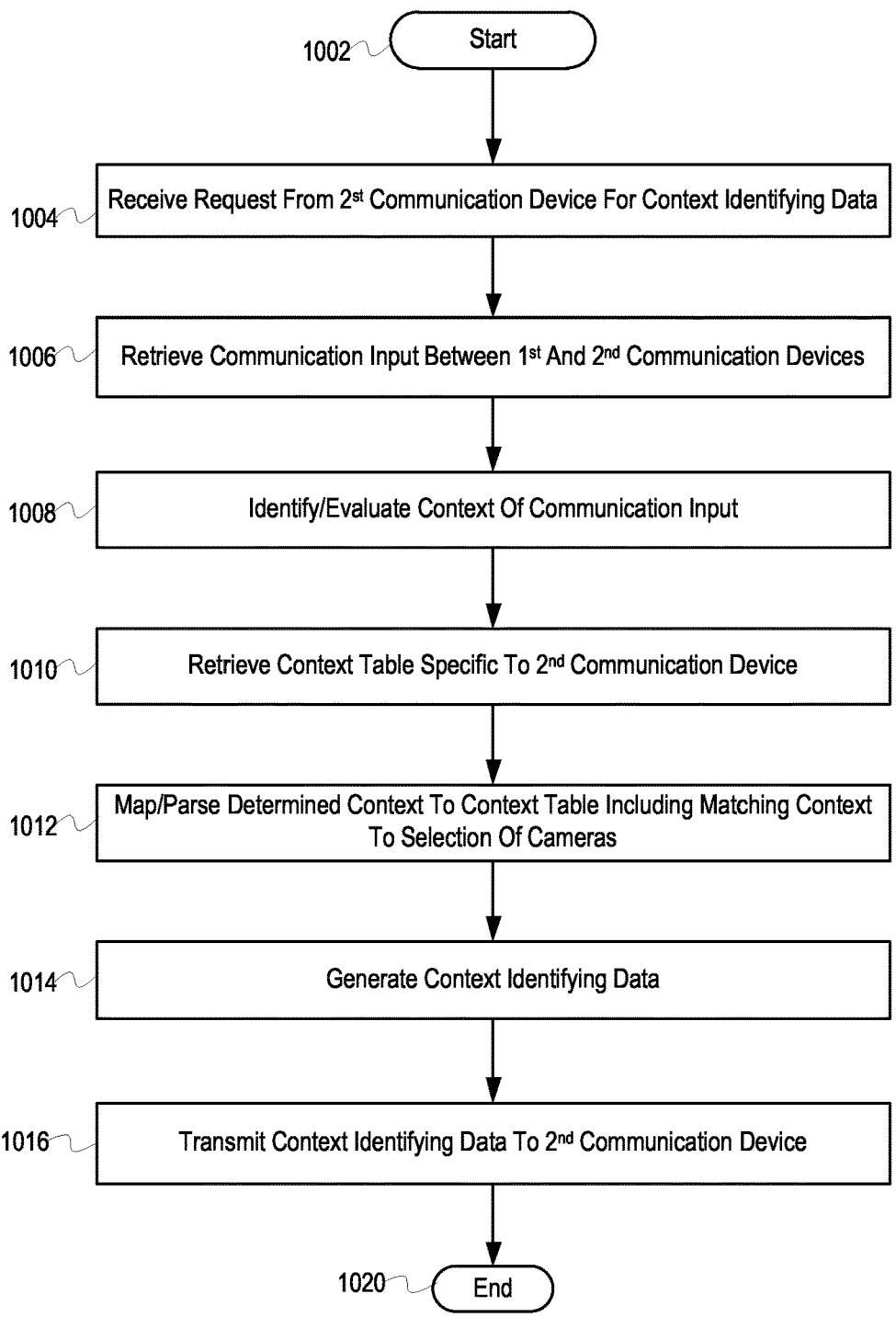
FIG. 10 depicts a flowchart of a method by which a communication device receives and responds to a request for context identifying data from another communication device, according to one or more embodiments.
Figure 11A:
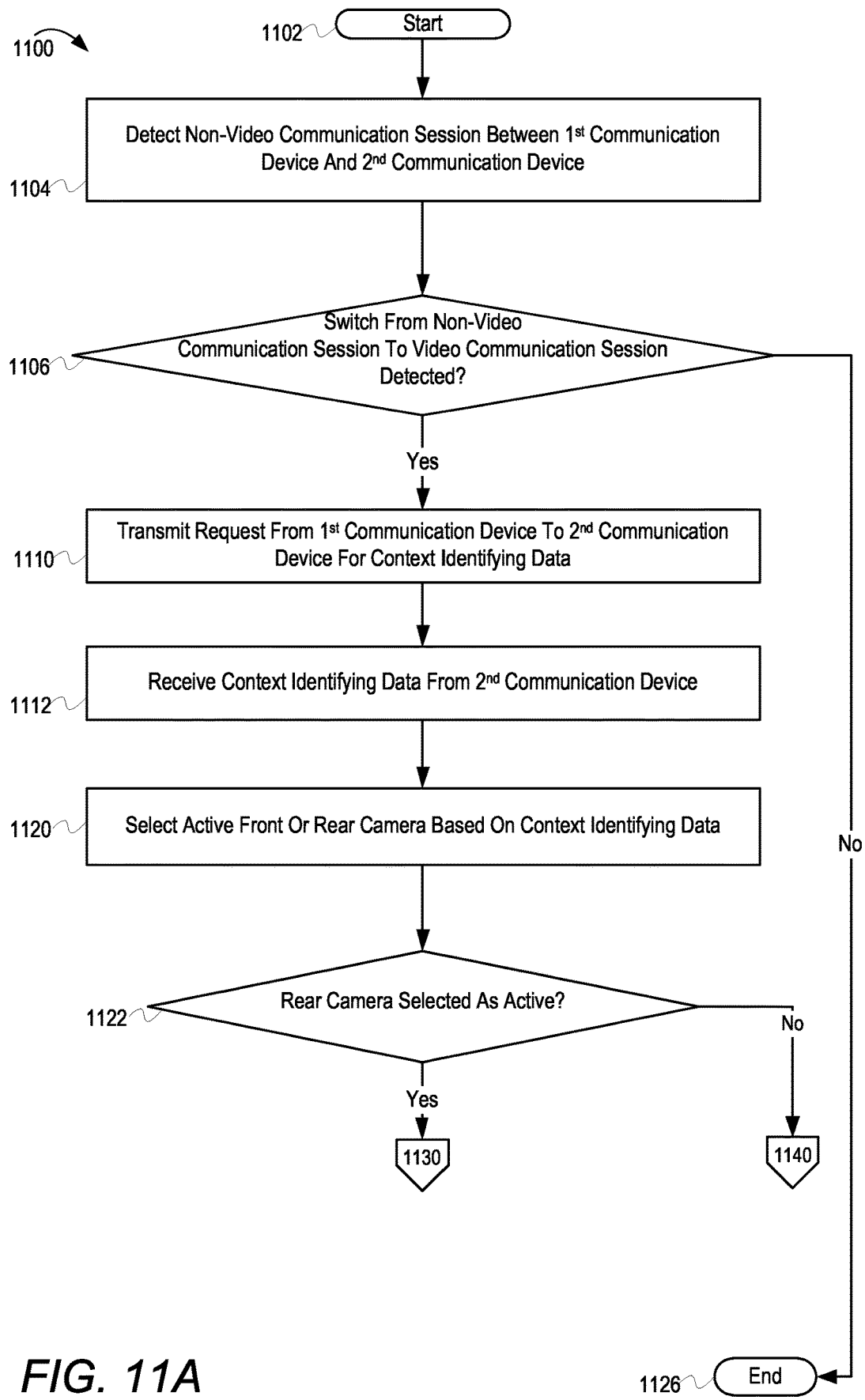
FIGS. 11A and 11B depict a flowchart of a method by which a communication device receives context identifying data from another communication device and selects an active camera from among at least one front facing camera and at least one rear facing camera for use by the communication device during a video communication session, according to one or more embodiments.
Figure 11B:
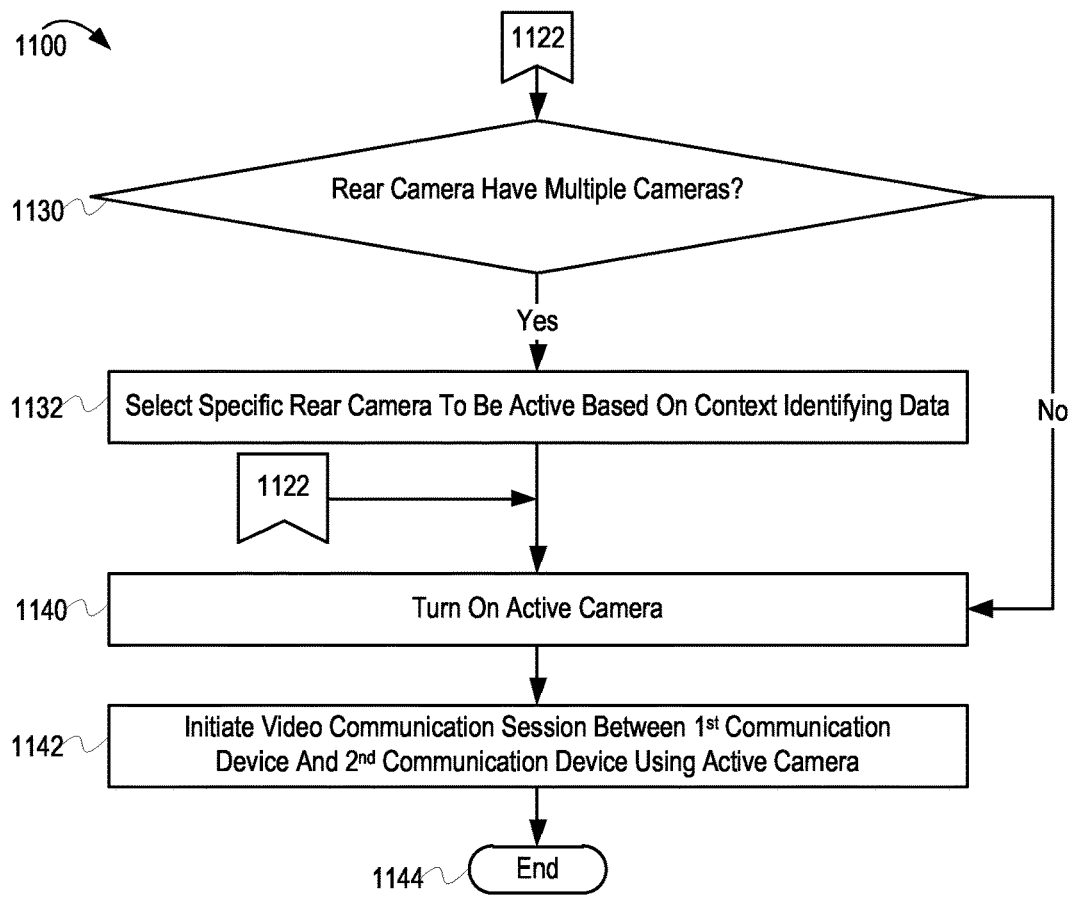

FIGS. 9A-9B depicts method 900 by which communication device 100 contextually selects an active camera from among at least one front facing camera and at least one rear facing camera for use by communication device during a video communication session. FIG. 10 depicts method 1000 by which a communication device receives and responds to a request for context identifying data from another communication device. FIGS. 11A-11B depict method 1100 by which communication device 300 selects an active camera from among at least one front facing camera and at least one rear facing camera for use by the communication devices during a video communication session. The description of methods 900, 1000 and 1100 will be described with reference to the components and examples of FIGS. 1-8B.

The operations depicted in FIGS. 9A-9B, and 10 can be performed by communication device 100 or any suitable communication device that includes the one or more functional components of communication device 100 that provide/enable the described features. One or more of the processes of the methods described in FIGS. 9A-9B, and 10 may be performed by processor 102 executing program code associated with CSCE module 136 and NLP engine 212. The operations depicted in FIGS. 11A-11B can be performed by communication device 300 or any suitable communication device that includes the one or more functional components of communication device 300 that provide/enable the described features. One or more of the processes of the methods described in FIGS. 11A-11B may be performed by processor 302 executing program code associated with CS module 322.

With specific reference to FIG. 9A, method 900 begins at the start block 902. At block 904, processor 102 detects that a non-video communication session (i.e., at least one of audio communication session 380, text communication session 382 and application communication session 384) is occurring between communication device 100 and communication device 300. Processor 102 receives and stores non-video communication input (i.e., communication input 220) associated with a non-video communication session (block 906). In one embodiment, communication input 220 can be audio communication input 222 that is received via microphone 108.

Processor 102 determines if a switch from the non-video communication session to a video communication session 386 has been detected (decision block 908). In response to determining that a switch from the non-video communication session to a video communication session 386 has not been detected, method 900 returns to block 902. In response to determining that a switch from the non-video communication session to a video communication session 386 has been detected, processor 102 processes non-video communication input 220 through NLP engine 212 using one or more NLP processes (block 910), and generates a text transcription corresponding to the non-video communication input 220 (block 912). Processor 102 determines one or more contexts (e.g., first context 232) from the text transcription (block 914). For example, processor 102 can determine that the text transcription includes various keywords that are used to identify one or more contexts.

Processor 102 retrieves context table 252 from system memory 120 (block 916). Context table 252 is used to map/parse the context (i.e. first context 232) to one or more entries within context table 252. Processor 102 maps/parses the determined context to the context table 252 (block 918) and identifies any context types 520 associated with the determined context (block 920). In one embodiment, processor 102 can store context identifiers 510 and context types 520 as context identifying data 272 to system memory 120.

Processor 102 selects, based on the mapping/parsing, a corresponding one of front facing cameras 132 or one of rear facing cameras 133 as an active camera (block 922). For example, if the first context is related to a self-image about the communication device user, the selected camera can be main front facing camera 132A. At decision block 924, processor 102 determines if rear facing camera (133) has been selected to be the active camera.

With additional reference to FIG. 9B, in response to determining that rear facing camera (133) has been selected to be the active camera, processor 102 determines if the rear facing ICD 133 includes multiple cameras (decision block 930). Processor 102 can retrieve ICD types 210 from system memory 120. Processor 102 uses ICD types 210 to determine if communication device 100 has multiple rear facing cameras. In response to determining that rear facing camera (133) includes multiple cameras, processor 102 selects a specific one of the rear facing cameras 133A, 133B or 133C based on the mapped/parsed context (block 932). For example, if the first context is related to "place" and "far object", the selected camera can be telephoto angle camera 133C.

After block 932, and in response to determining that rear facing ICD 133 does not include multiple cameras (decision block 930) and when rear facing ICD 133 is not active (decision block 924), processor 102 triggers ICD controller 134 to activate the selected rear facing camera (block 940) for use during video communication session 386. ICD controller 134 can receive the selected active camera from processor 102.

Processor 102 initiates video communication session 386 between communication device 100 and communication device 300 using the selected active camera (block 942). The active camera captures video content within a corresponding field of view (FOV) during the video communication session 386. Method 900 then terminates at end block 944.

Referring to FIG. 10, method 1000 by which communication device 100 receives and responds to a request for context identifying data from another communication device is shown. Method 1000 begins at the start block 1002. At block 1004, processor 102 receives a request 860 for context identifying data 272 from communication device 300 via communication interface 165 and wireless network 150. The first context identifying data 272 is generated using the NLP engine 212 and CSCE module 136 at communication device 100, based on information within the exchanged non-video communication session with communication device 300. Processor 102 retrieves prior non-video communication with communication device 300 from stored communication input 220 (block 1006) and identifies/evaluates communication input 220 in order to determine one or more contexts (block 1008). Processor 102 retrieves from context database 250 a context table that includes contexts specific to communication device 300 including details of the cameras of communication device 300 (block 1010). Processor 102 maps/parses the determined context to the context table including matching the context to selection of front or rear cameras on requesting communication device 300 (block 1012). Processor 102 generates context identifying data 272 based on mapping/parsing the determined context to the context table (block 1014). Processor 102 transmits a response 862 containing the context identifying data 272 (with camera selection details) to communication device 300 (block 1016). The context identifying data 272 is used by communication device 300 to select which camera to activate during video communication session 386. Method 1000 then ends at end block 1020.

FIGS. 11A-11B show method 1100 by which communication device 300, not equipped with an NLP engine, is triggered to select an active camera from among at least one front facing camera and at least one rear facing camera for use by the communication devices during a video communication session. With specific reference to FIG. 11A, method 1100 begins at the start block 1102. Processor 302 detects that a non-video communication session (i.e., at least one of audio communication session 380, text communication session 382 and application communication session 384) is occurring between communication device 300 and communication device 100 (block 1104). Processor 302 determines if a switch from the non-video communication session to a video communication session 386 has been detected (decision block 1106).

In response to determining that a switch from the non-video communication session to a video communication session 386 has not been detected, method 1100 ends at end block 1126. In response to determining that a switch from the non-video communication session to a video communication session 386 has been detected, processor 302 transmits request 860 to communication device 100 for context identifying data 272 (block 1110). Processor 302 receives a response 862 from communication device 100 containing the context identifying data 272 and stores the context identifying data as context identifying data 326 (block 1112). The context identifying data is generated, at communication device 100, based on information within the exchanged non-video communication session.

Processor 302 selects a corresponding one of front facing camera 632 or rear facing camera (633) as an active camera based on the context identifying data 326 (block 1120). For example, if the first context is related to a conversation about the user, the selected camera can be main front facing camera 632A. At decision block 1122, processor 302 determines if a rear facing camera 633 has been selected to be the active camera.

With additional reference to FIG. 11B, in response to determining that a rear facing camera 633 has been selected to be the active camera, processor 302 determines if the rear facing camera 633 includes multiple cameras (decision block 1130). Processor 102 can use stored ICD types to determine if communication device 300 has multiple rear facing cameras. In response to determining that rear facing camera 633 includes multiple cameras, processor 302 selects a specific one of the rear facing camera 633A, 633B or 633C based on the context identifying data 326 (block 1132). For example, if the first context is related to "place" and "large object", the selected camera can be wide angle camera 633B.

After block 1132, and in response to determining that rear facing camera 633 does not include multiple cameras (decision block 1130) and the rear facing camera 633 is not active (decision block 1122), processor 302 triggers ICD controller 134 to activate the selected camera (block 1140) for use during video communication session 386. ICD controller 134 can receive the selected active camera from processor 302.

Processor 302 initiates video communication session 386 between communication device 300 and communication device 100 using the selected active camera (block 1142). The active camera captures video content within a corresponding field of view (FOV) during the video communication session 386. Method 1100 then terminates at end block 1144.

In the above-described methods of FIGS. 9A-11B, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A first communication device comprising:
   at least one front facing camera and at least one rear facing camera;
   a display;
   a communication interface that enables the first communication device to communicatively connect, via a communication session, to at least one second communication device via at least one network;
   a memory having stored thereon a camera selection module for selecting at least one of the front facing camera or the rear facing camera for use by the first communication device; and
   at least one processor communicatively coupled to a controller of the at least one front facing camera and the at least one rear facing camera, and communicatively coupled to the display, the communication interface, and the memory, the at least one processor executing program code of the camera selection module, which enables the first communication device to:
      detect a request to transition to a video communication session with the second communication device following exchange of communication via a non-video communication session;
      receive, from the second communication device, first context identifying data that identifies which of the at least one front facing camera or the at least one rear facing camera to activate, the first context identifying data being generated at the second communication device based on information within the exchanged communication; and
      select and activate the at least one of the front facing camera or the at least one of the rear facing camera identified by the received first context identifying data.

2. The first communication device of claim 1, wherein the at least one processor:
   in response to detecting that the video communication session is to be initiated, transmits to the second communication device via the communication interface, the request for the first context identifying data from the second communication device.

3. The first communication device of claim 1, wherein the second communication device includes a natural language processing engine, the natural language processing engine generating the first context identifying data based on first communication input received during the non-video communication session.

4. The first communication device of claim 1, wherein the at least one processor:
   turns on the identified one of the at least one front facing or the at least one rear facing camera as an active camera; and
   initiates the video communication session using the active camera.

5. The first communication device of claim 1, wherein the at least one processor:
   determines if the received first context identifying data includes information related to a selected type of camera to activate from among the at least one rear facing camera;
   identifies whether the first communication device has a plurality of rear facing cameras;
   in response to determining that the first communication device has a plurality of rear facing cameras, parses the received first context identifying data to identify a sub-context type, from among a plurality of sub-context types corresponding to known characteristics of different ones of the plurality of rear facing cameras; and
   selects a particular rear facing camera to be the active rear facing camera from among the plurality of rear facing cameras based on the sub-context type.

6. The first communication device of claim 5, wherein the at least one processor:
   turns on the active rear facing camera; and
   initiates the video communication session using the active rear facing camera.

7. The first communication device of claim 1, wherein the non-video communication session between the first communication device and the at least one second communication device is at least one of:
   an audio communication session;
   a text communication session; and
   an application communication session.

8. A method comprising:
   detecting, via a processor, a request to transition to a video communication session between a first communication device and at least one second communication device following exchange of communication via a non-video communication session;
   receiving, at the first communication device from the at least one second communication device via a communication interface, first context identifying data that identifies which of at least one front facing camera or at least one rear facing camera to activate, the first context identifying data being generated at the at least one second communication device based on information within the exchanged communication; and
   selecting and activating the at least one of the front facing camera or the at least one of the rear facing camera identified by the received first context identifying data.

9. The method of claim 8, wherein the method further comprises:
   in response to detecting that the video communication session is to be initiated, transmitting to the at least one second communication device via the communication interface, the request for the first context identifying data from the at least one second communication device.

10. The method of claim 8, wherein the at least one second communication device includes a natural language processing engine, the natural language processing engine generating the first context identifying data based on first communication input received during the non-video communication session.

11. The method of claim 8, wherein the method further comprises:
   turning on the identified one of the at least one front facing or the at least one rear facing camera as an active camera; and
   initiating the video communication session using the active camera.

12. The method of claim 8, wherein the method further comprises:
   determining if the received first context identifying data includes information related to a selected type of camera to activate from among the at least one rear facing camera;
   identifying whether the first communication device has a plurality of rear facing cameras;
   in response to determining that the first communication device has a plurality of rear facing cameras, parsing the received first context identifying data to identify a sub-context type, from among a plurality of sub-context types corresponding to known characteristics of different ones of the plurality of rear facing cameras; and
   selecting a particular rear facing camera to be an active rear facing camera from among the plurality of rear facing cameras based on the sub-context type.

13. The method of claim 12, wherein the method further comprises:
   turning on the selected active rear facing camera; and
   initiating the video communication session using the active rear facing camera.

14. The method of claim 8, wherein the non-video communication session between the first communication device and the at least one second communication device is at least one of:
   an audio communication session;
   a text communication session; and
   an application communication session.

15. A computer program product comprising:
   a non-transitory computer readable storage device having stored thereon program code which, when executed by at least one processor of a communication device having at least one front facing camera, at least one rear facing camera, a display, a communication interface that enables the communication device to communicatively connect to at least one second communication device via at least one network, and a memory, enables the communication device to complete the functionality of:
      detecting a request to transition to a video communication session with the second communication device following exchange of communication via a non-video communication session;
      receiving, from the second communication device, first context identifying data that identifies which of the at least one front facing camera or the at least one rear facing camera to activate, the first context identifying data being generated at the second communication device based on information within the exchanged communication; and
      selecting and activating the at least one of the front facing camera or the at least one of the rear facing camera identified by the received first context identifying data.

16. The computer program product of claim 15, wherein the program code for selecting an active camera comprises program code that further enables the communication device to complete the functionality of:
   in response to detecting that the video communication session is to be initiated, transmitting to the second communication device via the communication interface, the request for the first context identifying data from the second communication device.

17. The computer program product of claim 15, wherein the second communication device includes a natural language processing engine, the natural language processing engine generating the first context identifying data based on first communication input received during the non-video communication session.

18. The computer program product of claim 15, wherein the program code for selecting an active camera comprises program code that further enables the communication device to complete the functionality of:
   turning on the identified one of the at least one front facing or the at least one rear facing camera as an active camera; and
   initiating the video communication session using the active camera.

19. The computer program product of claim 15, wherein the program code for selecting an active camera comprises program code that further enables the communication device to complete the functionality of:
   determining if the received first context identifying data includes information related to a selected type of camera to activate from among the at least one rear facing camera;
   identifying whether the first communication device has a plurality of rear facing cameras;

in response to determining that the first communication device has a plurality of rear facing cameras, parsing the received first context identifying data to identify a sub-context type, from among a plurality of sub-context types corresponding to known characteristics of different ones of the plurality of rear facing cameras; and selecting a particular rear facing camera to be the active rear facing camera from among the plurality of rear facing cameras based on the sub-context type.

20. The computer program product of claim 19, wherein the program code for selecting an active camera comprises program code that further enables the communication device to complete the functionality of:

turning on the active rear facing camera; and initiating the video communication session using the active rear facing camera.

* * * * *